US010068488B2

(12) United States Patent
Ramaker et al.

(10) Patent No.: US 10,068,488 B2
(45) Date of Patent: Sep. 4, 2018

(54) SYSTEMS AND METHODS OF PROVIDING A DATA UPDATE TO AN AIRCRAFT

(71) Applicant: GE Aviation Systems LLC, Grand Rapids, MI (US)

(72) Inventors: Russell Allen Ramaker, Grandville, MI (US); Joachim Karl Ulf Hochwarth, Caledonia, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 98 days.

(21) Appl. No.: 14/700,485

(22) Filed: Apr. 30, 2015

(65) Prior Publication Data

US 2016/0328978 A1 Nov. 10, 2016

(51) Int. Cl.
*G08G 5/00* (2006.01)
*G01C 23/00* (2006.01)
*G01C 21/20* (2006.01)

(52) U.S. Cl.
CPC .......... *G08G 5/0039* (2013.01); *G01C 21/20* (2013.01); *G01C 23/00* (2013.01); *G08G 5/0013* (2013.01); *G08G 5/0021* (2013.01)

(58) Field of Classification Search
CPC .... G08G 5/003; G08G 5/0034; G08G 5/0039; G08G 5/0004; G08G 5/0013; G08G 5/0082; G08G 5/0047; G08G 5/0052; G08G 5/0056; G08G 5/006; G08G 5/0065; G08G 5/0086; G08G 5/0091; G08G 5/0095; G08G 5/0017; G08G 5/0021; G08G 5/00; G08G 5/0069; G08G 5/0073; G08G 5/0078; G08G 5/02; G08G 5/025; G08G 5/04; G08G 5/045; G08G 5/06; G08G 5/065; G08G 9/00; G08G 9/02; G08G 99/00; G06F 17/30; H04B 7/18506

See application file for complete search history.

(56) References Cited

U.S. PATENT DOCUMENTS

| | | | |
|---|---|---|---|
| 4,642,775 A * | 2/1987 | Cline | G01C 23/00 701/528 |
| 6,173,159 B1 | 1/2001 | Wright et al. | |
| 6,381,538 B1 | 4/2002 | Robinson et al. | |
| 6,438,468 B1 * | 8/2002 | Muxlow | G08G 5/0013 701/29.1 |
| 7,257,469 B1 * | 8/2007 | Pemble | G01C 23/005 340/945 |

(Continued)

FOREIGN PATENT DOCUMENTS

GB    2488916 A    9/2012

OTHER PUBLICATIONS

ARINC Protocol Tutorial, Jun. 7, 2000, Condor Engineering Inc.*

(Continued)

*Primary Examiner* — Thomas G Black
*Assistant Examiner* — Sara J Lewandroski
(74) *Attorney, Agent, or Firm* — GE Aviation Systems LLC; William Andes

(57) ABSTRACT

Systems and methods of providing a data update to an aircraft including requesting a data update related to a route to be flown by the aircraft, receiving flight procedure data in a data update into a component of the aircraft from a ground station in response to the request and updating the route to be flown utilizing the flight procedure data in the data update.

11 Claims, 5 Drawing Sheets

(56) References Cited

U.S. PATENT DOCUMENTS

| | | | | |
|---|---|---|---|---|
| 8,423,009 B2* | 4/2013 | Srinivasan | H04L 67/06 | 455/419 |
| 8,630,790 B1* | 1/2014 | Bailey | G08G 5/0039 | 340/951 |
| 8,862,287 B1* | 10/2014 | Clark | G01C 23/00 | 701/3 |
| 8,924,137 B2* | 12/2014 | Chan | G05D 1/104 | 244/158.1 |
| 9,558,670 B1* | 1/2017 | Sheth | G08G 5/0013 | |
| 2007/0129857 A1* | 6/2007 | Fortier | G08G 5/0039 | 701/16 |
| 2007/0219678 A1* | 9/2007 | Coulmeau | G01C 23/005 | 701/3 |
| 2008/0154486 A1* | 6/2008 | Coulmeau | G08G 5/0013 | 701/120 |
| 2009/0024312 A1* | 1/2009 | Brinkman | G01C 21/20 | 701/532 |
| 2009/0105943 A1 | 4/2009 | Ferro et al. | | |
| 2012/0116614 A1* | 5/2012 | Torres | G08G 5/0013 | 701/3 |
| 2012/0215435 A1* | 8/2012 | Subbu | G08G 5/0013 | 701/120 |
| 2012/0245834 A1* | 9/2012 | Klooster | G08G 5/0034 | 701/120 |
| 2013/0024850 A1* | 1/2013 | Nutaro | G06F 8/658 | 717/169 |
| 2013/0046422 A1* | 2/2013 | Cabos | G08G 5/0034 | 701/3 |
| 2013/0085661 A1* | 4/2013 | Chan | G05D 1/104 | 701/122 |
| 2013/0085669 A1* | 4/2013 | Bailey | G08G 5/0039 | 701/467 |
| 2013/0226373 A1* | 8/2013 | Bollapragada | G08G 5/0039 | 701/3 |
| 2013/0267186 A1* | 10/2013 | Agarwal | G01W 1/10 | 455/91 |
| 2014/0062729 A1* | 3/2014 | Conner | B64F 1/002 | 340/972 |
| 2014/0081483 A1* | 3/2014 | Weinmann | G08G 5/0021 | 701/14 |
| 2014/0257682 A1* | 9/2014 | Agarwal | G08G 5/0039 | 701/120 |
| 2014/0309821 A1* | 10/2014 | Poux | G08G 5/0021 | 701/14 |
| 2015/0213720 A1* | 7/2015 | Axtell | G08G 5/0095 | 701/120 |
| 2015/0269790 A1* | 9/2015 | Batcheller | G08G 1/20 | 701/537 |
| 2016/0093222 A1* | 3/2016 | Hale | G08G 5/0039 | 701/120 |
| 2016/0125741 A1* | 5/2016 | Shorter, Jr. | G08G 5/0034 | 701/528 |
| 2016/0180715 A1* | 6/2016 | Burke | G08G 5/0008 | 701/467 |
| 2016/0229554 A1* | 8/2016 | Kawalkar | G01C 23/005 | |
| 2016/0335309 A1* | 11/2016 | Ceccom | G08G 5/0013 | |
| 2017/0083231 A1* | 3/2017 | Wang | G06F 3/04886 | |

OTHER PUBLICATIONS

Durham, "In Flight Optimization Services Offers Airlines More Fuel-Efficient En-Route Operations", Boeing has Developed a New Type of Flight Services that Enables Operators to Increase Fuel and Flight Efficiency and Reduce Costs and Carbon Emissions, pp. 21-23, 2011.

GB Combined Search and Examination Report issued in connection with corresponding GB Application No. 1607486.6 dated Oct. 20, 2016.

* cited by examiner

US 10,068,488 B2

SYSTEMS AND METHODS OF PROVIDING A DATA UPDATE TO AN AIRCRAFT

BACKGROUND OF THE INVENTION

A variety of aircraft data is available for use on an aircraft. Data relevant to a flight can be available from a number of aviation data sources. For example, an aircraft's navigation system e.g. Flight Management System (FMS) currently stores several databases. The database used for flight planning and trajectory prediction is the Navigation Database (NDB), which is stored in the FMS. The NDB is a static database that has a predetermined update cycle (e.g., 28 days) in which it is maintained. Currently, maintenance personnel are required to manually update the NDB on this cycle. The NDB is used to ensure that, for instance, planned closures of runways or navigational aids get reflected so that the flight crew or the FMS cannot select them during the predetermined time period between update cycles. The FMS can also store or access a Supplemental NDB that is used by the crew to store temporary navigation data.

Air Traffic Control (ATC) uses data communications to uplink route clearances to aircraft electronically. The FMS can then load the route clearance into the FMS where it can be inserted into the flight plan that will be used to guide the aircraft. These route clearances are currently limited to data that are contained within the static NDB of the FMS. The exception to that are waypoints that can also be defined by their position (i.e. latitude and longitude). Thus, while the ATC can up-link a clearance that contains a flight procedure that is not available in the NDB of the aircraft, the pilot will not be able to load it into the FMS.

BRIEF DESCRIPTION OF THE INVENTION

In one aspect, an embodiment of the invention relates to a method of providing a data update to an aircraft, the method comprising requesting a data update for a route to be flown by the aircraft, receiving the data update, including flight procedure data, from a ground station in response to the request, and updating the route to be flown based at least in part on the flight procedure data.

In another aspect, an embodiment of the invention relates to an updating system for an aircraft, comprising a wireless communication link and a flight management system that is communicably coupled to the communication link, and includes an update module configured to request, from a remote server via the communication link, a data update related to a route to be flown by the aircraft, and maintain flight procedure data included in the data update in at least one of a navigational database component, or loaded into a flight plan of the flight management system.

DETAILED DESCRIPTION

Figure 1:
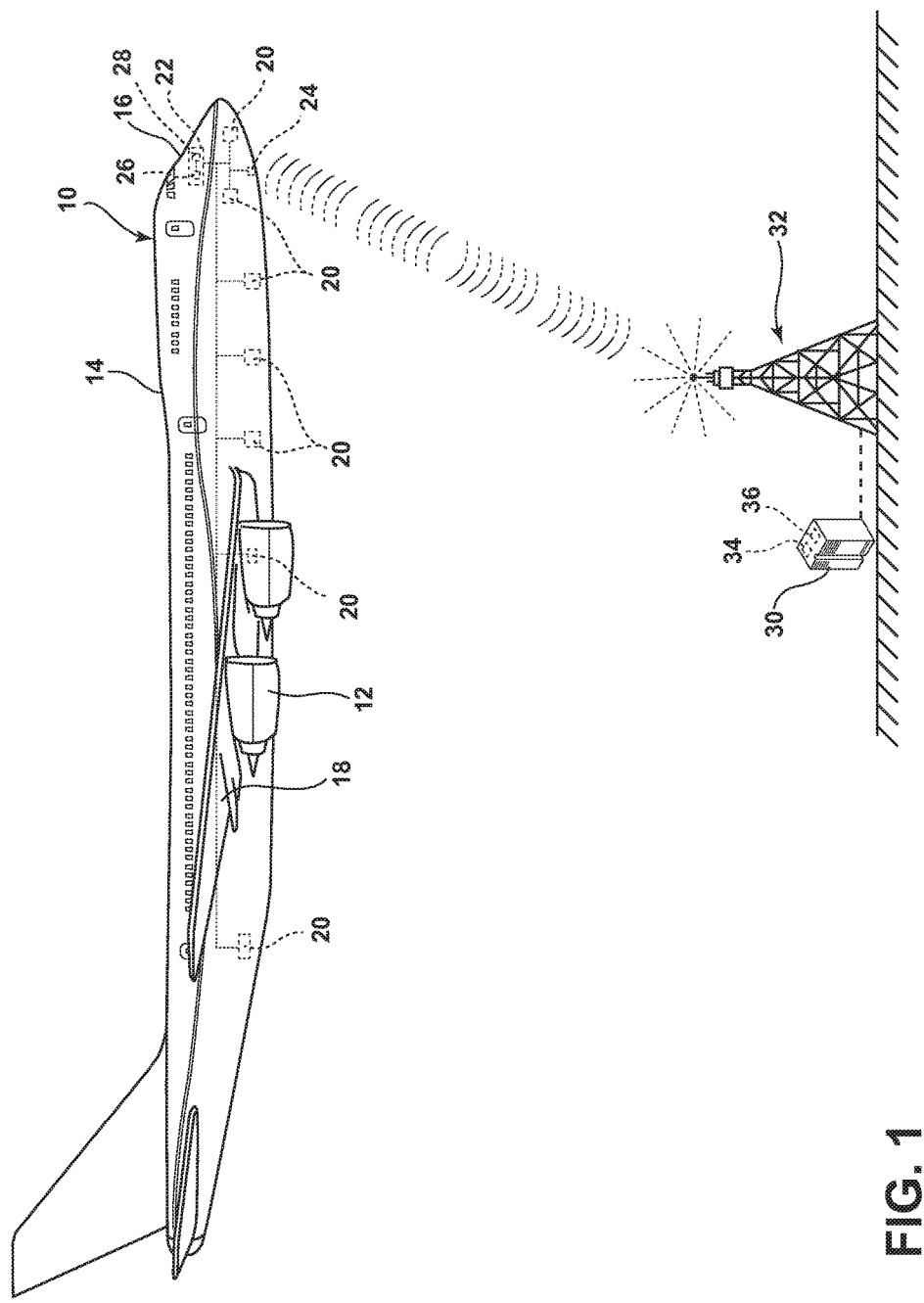
FIG. 1 is a schematic illustration of an aircraft and ground system according to an embodiment of the invention.

At least some of the following embodiments provide for aircraft updating systems and methods for uploading Navigation Database (NDB) information to the aircraft so that the NDB is dynamic rather than static. Currently, the NDB is typically updated manually during routine manual maintenance on the predetermined update cycle (e.g., 28 days). More specifically, maintenance personnel, during the routine maintenance, substitute an entirely new set of disks containing the NDB information or load the NDB information via Ethernet, and such data will then be the only data utilized until the next predetermined update cycle. FIG. 1 depicts an aircraft 10 that provides an environment for embodiments of the invention. The aircraft 10 can fly a route from one location to another and can include one or more propulsion engines 12 coupled to a fuselage 14. A cockpit 16 can be positioned in the fuselage 14 and wing assemblies 18 can extend outwardly from the fuselage 14. Further, a set of aircraft systems 20 that enable proper operation of the aircraft 10 can be included as well as a controller or computer 22, and a communication system having a communication link 24. It will be understood that "a set" can include any number of aircraft system(s), including only one aircraft system. While a commercial aircraft has been illustrated, it is contemplated that embodiments of the invention can be used in any type of aircraft, for example, without limitation, fixed-wing, rotating-wing, rocket, personal aircraft, Unmanned Aerial Systems (UASs), and military aircraft.

The set of aircraft systems 20 can reside within the cockpit 16, within the electronics and equipment bay (not shown), or in other locations throughout the aircraft 10 including that they can be associated with the engines 12. Such aircraft systems 20 can include but are not limited to an electrical system, an oxygen system, hydraulics or pneumatics system, a fuel system, a propulsion system, FMS, flight controls, audio/video systems, an Integrated Vehicle Health Management (IVHM) system, and systems associated with the mechanical structure of the aircraft 10.

The computer 22 can be operably coupled to the set of aircraft systems 20 and it is contemplated that the computer 22 can aid in operating the set of aircraft systems 20 and can receive information from the set of aircraft systems 20. The computer 22 can, among other things, automate the tasks of piloting and tracking the flight plan of the aircraft 10. The computer 22 can also be connected with other controllers or computers of the aircraft 10.

The computer 22 can include memory 26, the memory 26 can include Random Access Memory (RAM), Read-Only Memory (ROM), flash memory, or one or more different types of portable electronic memory, such as discs, DVDs, CD-ROMs, etc., or any suitable combination of these types of memory. The computer 22 can include one or more processors 28, which can be running any suitable programs. It will be understood that the computer 22 can include or be associated with any suitable number of individual microprocessors, power supplies, storage devices, interface cards, auto flight systems, flight management computers, and other standard components and that the computer 22 can include or cooperate with any number of software programs (e.g., flight management programs) or instructions designed to carry out the various methods, process tasks, calculations, and control/display functions necessary for operation of the aircraft 10.

The communication link 24 can be communicably coupled to the computer 22 or other processors of the aircraft to transfer information to and from the aircraft 10. It is contemplated that the communication link 24 can be a wireless communication link and can be any variety of communication mechanism capable of wirelessly linking with other systems and devices and can include, but is not limited to, satellite uplink, SATCOM internet, VHF Data Link (VDL), ACARS network, Automatic Dependent Surveillance-Broadcast (ADS-B), Wireless Fidelity (WiFi), WiMax, 3G wireless signal, Code Division Multiple Access (CDMA) wireless signal, Global System for Mobile communication (GSM), 4G wireless signal, Long Term Evolution (LTE) signal, or any combinations thereof. It will also be understood that the particular type or mode of wireless communication is not critical to embodiments of this invention, and later-developed wireless networks are certainly contemplated as within the scope of embodiments of this invention. Further, the communication link 24 can be communicably coupled with the computer 22 through a wired link without changing the scope of embodiments of this invention. Although only one communication link 24 has been illustrated, it is contemplated that the aircraft 10 can have multiple communication links communicably coupled with the computer 22. Such multiple communication links can provide the aircraft 10 with the ability to transfer information to or from the aircraft 10 in a variety of ways.

As illustrated, the computer 22 can communicate with a remote server 30, which can be located anywhere, such as at a designated ground station 32 via the communication link 24. The ground station 32 can be any type of communicating ground station 32 such as one operated by an Air Service Navigation Provider (ANSP)/Air Traffic Control (ATC). The remote server 30 can include a computer searchable database of information 34 accessible by a processor 36. The processor 36 can run a set of executable instructions to access the computer searchable database of information 34. The remote server 30 might include a general-purpose computing device in the form of a computer, including a processing unit, a system memory, and a system bus, that couples various system components including the system memory to the processing unit. The system memory can include ROM and RAM. The computer can also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. It will be understood that the computer searchable database of information 34 can be any suitable database, including a single database having multiple sets of data, multiple discrete databases linked together, or even a simple table of data. It is contemplated that the computer searchable database of information 34 can incorporate a number of databases or that the database can actually be a number of separate databases.

Figure 2:
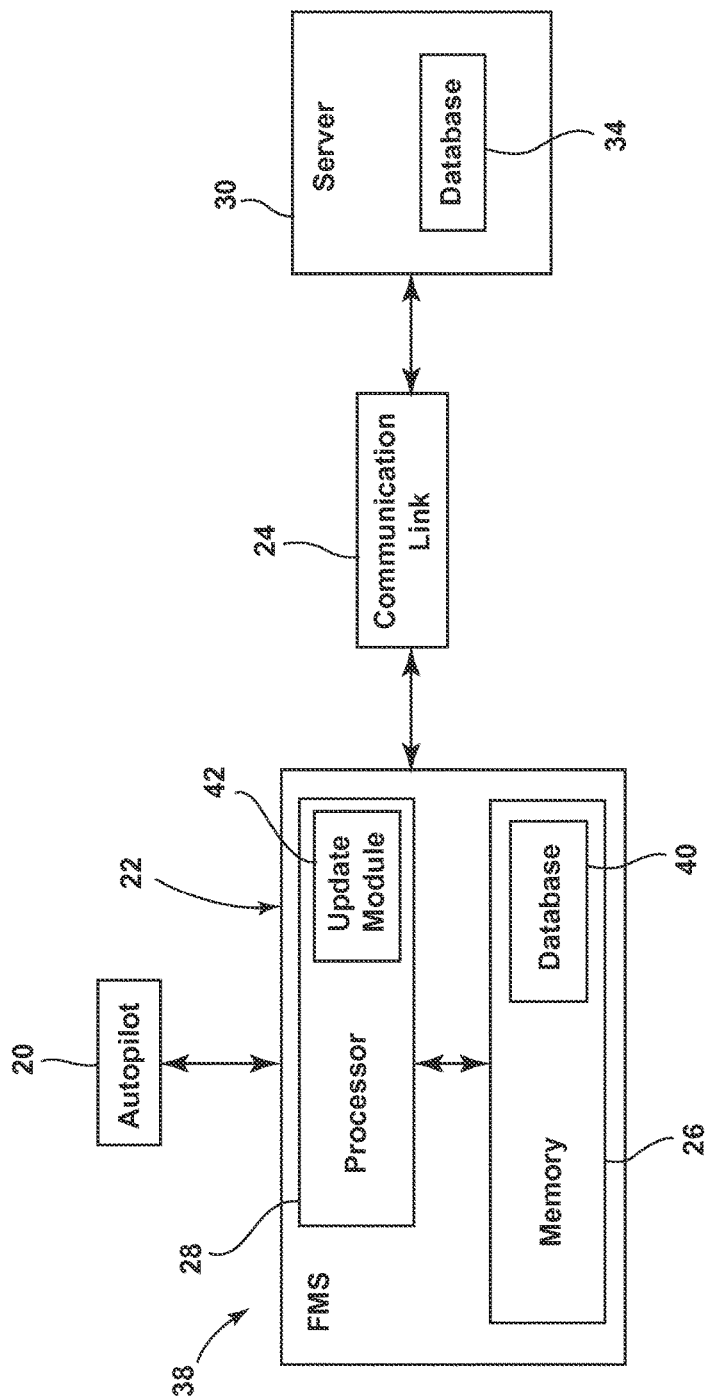
FIG. 2 is a block diagram of an aircraft updating system according to an embodiment of the invention, which can be utilized with the aircraft and ground system of FIG. 1.

During operation of the aircraft 10, the computer 22 can request and receive information from the remote server 30. In this manner, the computer 22 can form a portion of a system for providing a data update to the aircraft 10. As illustrated more clearly in FIG. 2, the system 38 for providing the data update can include the computer 22, which has been illustrated as forming a portion of the FMS. In the illustrated example, a database component 40 is illustrated as being included in the memory 26. It will be understood that the database component 40 can be any suitable database, including a single database having multiple sets of data, multiple discrete databases linked together, or even a simple table of data. It is contemplated that the database component 40 can incorporate a number of databases or that the database can actually be a number of separate databases. The database component 40 can be an NDB containing information including, but not limited to, airports, runways, airways, waypoints, terminal areas, navigational aids, airline/company-specific routes, and procedures such as Standard Instrument Departure (SID), and Standard Terminal Approach Routes (STAR). The database component 40 can alternatively include memory in the FMS containing a flight plan.

Further, an update module 42 is illustrated as being included in the processor 28. The update module 42 can be configured to request a data update related to a route to be flown by the aircraft 10 from the remote server 30. For example, the update module 42 can include, but is not limited to, a computer program running on the processor 28 that can request information from the remote server 30. More specifically, the update module 42 can seek the data update from the remote server 30 via the wireless communication link 24. It is contemplated that such a process can be user initiated or can be implemented automatically by the update module 42 when the aircraft 10 is in flight or when the aircraft is on the ground. Flight procedure data received in a data update can be loaded into the database component 40. It is contemplated that the database component 40 can include both the otherwise static flight procedure information and the dynamic data received in the data update. It will be understood that the database component 40 can be an NDB having a predefined update cycle, including but not limited to a 28-day cycle, and that receiving the flight procedure data in the data update occurs separate from the predefined update cycle. Because the predefined update cycle is carried out manually by maintenance personnel on a predetermined update cycle, the NDB is considered a static database.

Figure 3:
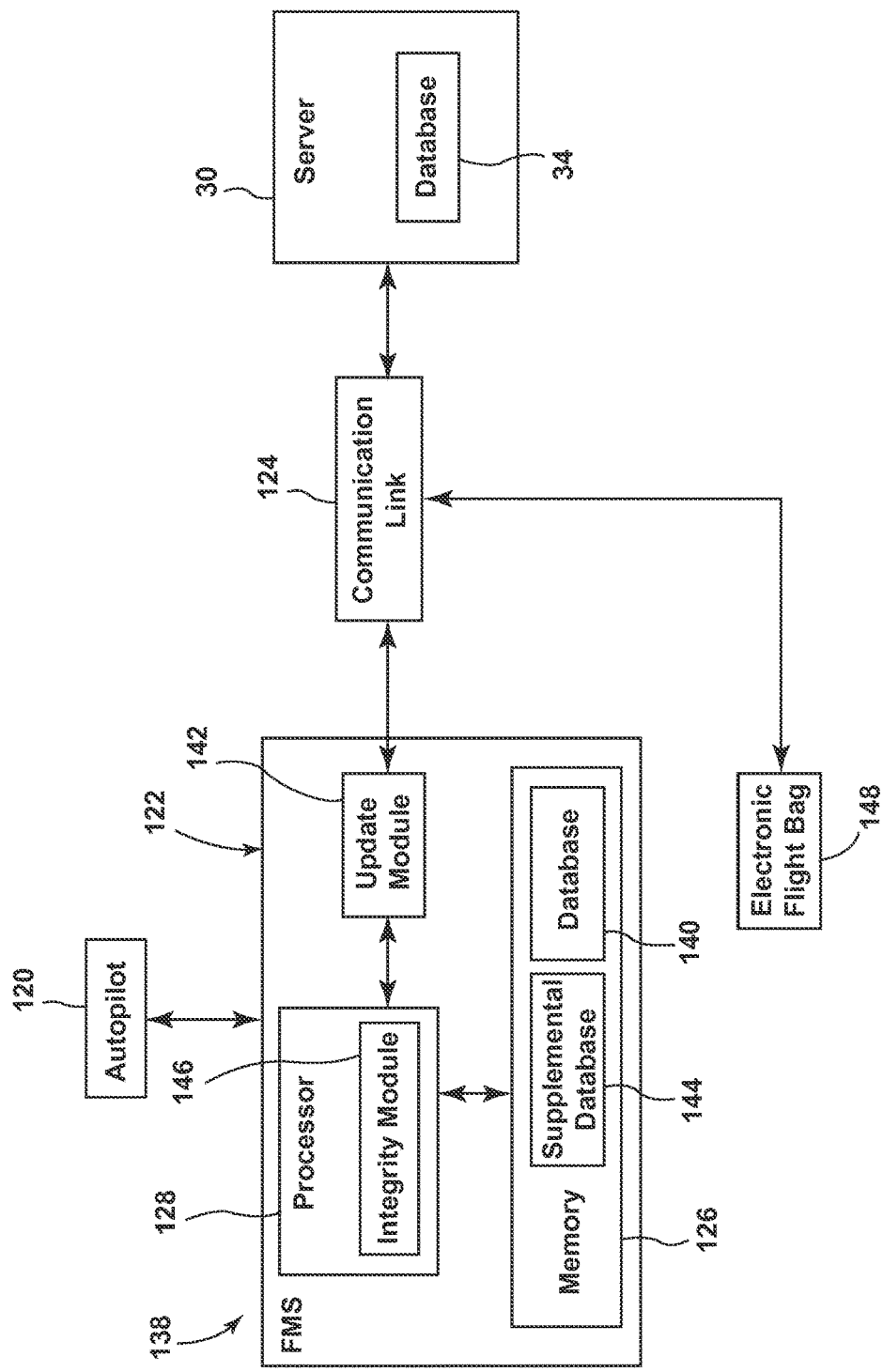
FIG. 3 is a block diagram of an aircraft updating system according to an embodiment of the invention, which can be utilized with the aircraft and ground system of FIG. 1.

FIG. 3 illustrates an alternative updating system 138 that is similar to the system 38 and it will be understood that the description of the like portions of the system 38 applies to the updating system 138, unless otherwise noted. One difference is that an additional or supplemental database component 144 is included in the memory 126 and can be utilized for storage of the received flight procedure data in the data update. It will be understood that the supplemental database component 144 can be any suitable database, including a single database having multiple sets of data, multiple discrete databases linked together, or even a simple table of data. It is contemplated that the supplemental database component 144 can incorporate a number of databases or that the database can actually be a number of separate databases.

Further, an integrity module 146 is illustrated as being included in the processor 128. The integrity module 146 can be configured to check the integrity of the flight procedure data received in a data update. The term "integrity" as used herein refers to data verification. By way of non-limiting example, the integrity of the flight procedure data may be checked such that accidental changes to raw data can be detected. By way of example, the integrity module can include, but is not limited to, a computer program such as a cyclic redundancy check running on a processor. While illustrated as being included in the processor 128, it will be understood that the integrity module 146 can be included in any portion of the FMS. The update module 142 has been illustrated as separate from the processor 128 to illustrate that it can also be included in any portion of the FMS.

Further still, an autopilot system 120 is specifically illustrated as being operably coupled to the computer 122. It will be understood that the computer 122 can provide the flight procedure data received in the data update to other systems in the aircraft 10 including, but not limited to, the illustrated autopilot system 120. Similarly, an electronic flight bag 148 can be included in the aircraft 10 and the flight procedure data can also be loaded into electronic flight bag 148. By way of non-limiting example, the computer 122 can upload the flight procedure data received in the data update to the electronic flight bag 148 via the wireless communication link 124.

The above-described embodiments could also be used for dynamically updating additional information such as airline or company-specific data. By way of non-limiting example, such company-specific data can include commonly used flight plans or routes. Such information could also be stored in the database component 140 or supplemental database component 144. It will be understood that the above-described embodiments can include sufficient security including, but not limited to, end-to-end encryption so as to avoid malicious content in the received data update. For example, the system may include a security module configured to check authenticity of the flight procedure data in the data update. The term "authenticity" as used herein refers to the genuineness of the communication. By way of non-limiting examples, checking for authenticity may include checking the flight procedure data to avoid malicious content or to prevent spoofing and denial of service attacks.

It will be understood that details of environments that can implement embodiments of the invention are set forth in order to provide a thorough understanding of the technology described herein. It will be evident to one skilled in the art, however, that the exemplary embodiments can be practiced without these specific details. The exemplary embodiments are described with reference to the drawings. These drawings illustrate certain details of specific embodiments that implement a module or method, or computer program product described herein. However, the drawings should not be construed as imposing any limitations that can be present in the drawings. The method and computer program product can be provided on any machine-readable media for accomplishing their operations. The embodiments can be implemented using an existing computer processor, or by a special purpose computer processor incorporated for this or another purpose, or by a hardwired system.

As noted above, embodiments described herein can include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions include, but are not limited to, instructions and data, which cause a general-purpose computer, special purpose computer, or special purpose processing machines to perform a certain function or group of functions.

Embodiments will be described in the general context of method steps that can be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments can be practiced in a networked environment using logical connections to one or more remote computers having processors. Logical connections can include a Local Area Network (LAN) and a Wide Area Network (WAN) that are presented here by way of example and not limitation. Such networking environments are commonplace in office-wide or enterprise-wide computer networks, intranets and the internet and can use a wide variety of different communication protocols. Those skilled in the art will appreciate that such network computing environments will typically encompass many types of computer system configurations, including personal computers, hand-held devices, multiprocessor systems, microprocessor-based or programmable consumer electronics, network PCs, mini-computers, mainframe computers, and the like.

Embodiments can also be practiced in distributed computing environments where tasks are performed by local and remote processing devices that are linked (either by hardwired links, wireless links, or by a combination of hardwired or wireless links) through a communication network. In a distributed computing environment, program modules can be located in both local and remote memory storage devices.

Figure 4:
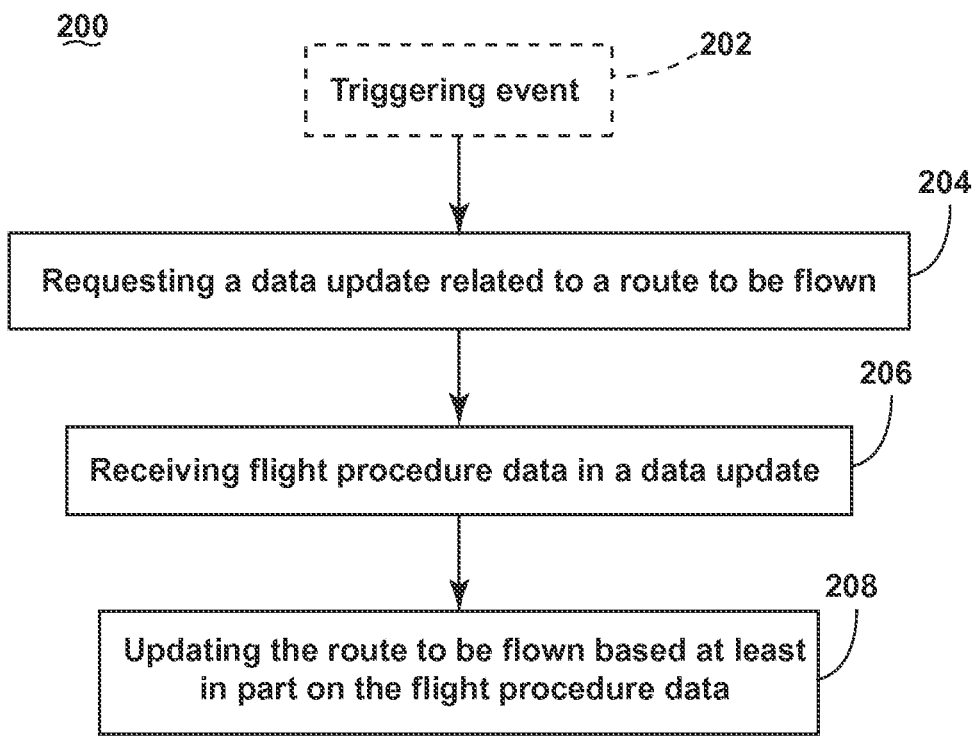
FIG. 4 is a flowchart showing a method of providing information via an aircraft updating system, such as illustrated in FIGS. 2 and 3, according to an embodiment of the invention.

In accordance with an embodiment of the invention, FIG. 4 illustrates a method 200 for providing a data update to an aircraft, such as the aircraft 10. The method can begin by an optional triggering event 202. Such a triggering event can include a predetermined period of time outside of the predefined update cycle or a change in conditions along the flight plan. In this manner, flight procedures can be updated on a daily or hourly basis or can reflect atmospheric conditions including winds and severe weather. By way of further non-limiting examples, the triggering event at 202 can include a predetermined portion of the flight plan. For example, such triggering events can include, but are not limited to, pre-departure of the flight or the beginning of the cruise phase.

At 204, the method 200 includes requesting a data update related to a route to be flown by the aircraft 10. The route to be flown can include a route defined before flight of the aircraft or defined during flight of the aircraft. Such a request can be made by the update module 42, 142 of the updating system 38, 138. More specifically, the update module 42, 142, via the wireless communication link 24, 124, can request such a data update from the remote server 30.

The request can be automatically made by the update module 42, 142 based on the triggering event at 202. For example, it is contemplated that the request is automatically made upon the route being defined and received by the computer 22, 122 forming at least a portion of the FMS. By way of further example, in the instance where the triggering event is a pre-departure portion of the flight, the requesting can occur automatically during pre-departure. Alternatively, the request can be made by the update module periodically such as every hour during flight of the aircraft 10. By way of further non-limiting example, a crew member can manually request a data update.

Flight procedure data can be received in a data update at 206. It will be understood that such flight procedure data in the data update can be any amount of data from any suitable system or asset, including the remote server 30. By way of non-limiting example, the flight procedure data in the data update can include any airport information, runway information including but not limited to runway closures, airway information including but not limited to special activity spaces, waypoint information, navigational aid information including but not limited to navigational aid shutdowns, or airline specific route information, or terminal procedures such as SID, STAR or approaches.

The receiving at 206 can be automatic in response to the request at 204. The flight procedure can be received by the updating system 38, 138, via the wireless communication link 24, 124, from the remote server 30. More specifically, the flight procedures in the data update can be received into the database component 40, 140 or supplemental database component 144. It is contemplated that the flight procedure data in the data update can be directly synched into the database component 40, 140 or supplemental database component 144 and that no formatting is required to synch the flight procedure data into the database component 40, 140 or supplemental database component 144. It is also envisioned that the data update may be loaded directly into the flight plan of the FMS. By way of non-limiting example, the flight procedure data in the data update can contain procedures represented in ARINC 424 format and encoded in a binary format that can include, but is not limited to, binary XML. The computer 22, 122 forming at least a portion of the FMS can take the flight procedure data in the data update and insert it into its database component 40, 140 or supplemental database component 144. The data transport of the flight procedure data in the data update between the remote server 30 and the aircraft 10 could be implemented using a datalink protocol such as the Williamsburg (II) protocol. For example, the ARINC 424 data could be sent using a Williamsburg (II) wrapper or Aeronautical Telecommunication Network (ATN). Alternatively, the processor 28, 128 can be configured to format the flight procedure data in the data update such that it is compatible with the database component 40, 140 or supplemental database component 144. For example, the processor 28 can convert the binary packaged data to a proprietary format. Further still, the flight procedures in the data update can be received into the active flight plan of the FMS. More specifically, the data update can be received into the flight plan after pilot review and approval.

The information received at 206 can then be utilized in generating a route to be flown at 208. More specifically, the flight procedure data in the data update can be utilized by the FMS in how the aircraft 10 is flown along the route. It will be understood that the updated flight procedure data does not include which route to fly but instead covers how the route should be flown. It will be understood that both the computer 22, 122 forming at least a portion of the FMS and the aircrew can utilize the flight procedure data that was received in the data update. For example, a pilot can select the newly uploaded flight procedures into the flight plan allowing the aircraft 10 to fly the flight procedure. The computer 22, 122 forming at least a portion of the FMS can also provide the information received in the data update to other systems in the aircraft 10 such as the autopilot system or an electronic flight bag aboard the aircraft 10. In this manner, the updated flight procedure can be inserted into the route to be flown and the aircraft can be flown accordingly.

Further, additional data associated with the flight procedures may be received. For example, such additional data can reflect atmospheric conditions including winds and severe weather. Further still, additional data such as Notice to Airmen (NOTAM) can be received and may include information regarding potential hazards along a flight route. In this manner, the updating module may be utilized to synchronize additional data.

It will be understood that the method 200 is flexible and the method 200 is illustrated merely for illustrative purposes. For example, the sequence of steps depicted is for illustrative purposes only, and is not meant to limit the method 200 in any way, as it is understood that the steps can proceed in a different logical order or additional or intervening steps can be included without detracting from embodiments of the invention. By way of non-limiting example, an alert within the aircraft 10 can be provided when an update is available to a procedure that is loaded into the computer 22, 122 forming at least a portion of the FMS. In this manner, the flight crew can be alerted if a procedure has been modified and is out-of-date in the database component 40, 140 or supplemental database component 144 of the FMS. It is contemplated that the computer 22, 122 could communicate and interact with the remote server 30 to determine when an update is available. The computer 22, 122 could then automatically update or have the flight crew request the update regardless of whether the out-of-date information was related to the route to be flown. Further still, the computer 22, 122 could provide information to ANSP or ATC regarding the version of the procedure that is loaded in the computer 22, 122 so that appropriate route clearances could be received from the ATC.

Figure 5:
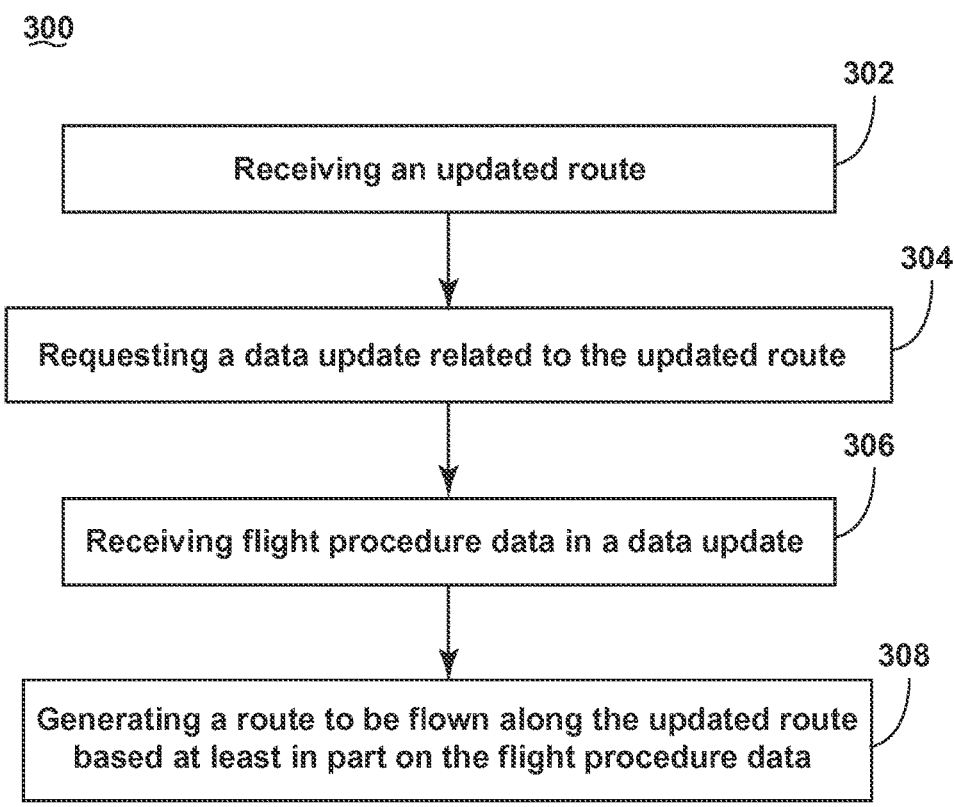
FIG. 5 is a flowchart showing another method of providing information via an aircraft updating system, such as illustrated in FIGS. 2 and 3, according to an embodiment of the invention.

By way of further example, the computer 22, 122 can automatically request flight procedure data referenced in up-linked route clearances received from ATC but missing from the database component 40, 140 or supplemental database component 144. In this manner, providing a data update to the aircraft can be triggered when an updated route is received such as illustrated in the method 300 of FIG. 5. The method 300 is similar to the method 200 and it will be understood that the description of the like portions of the method applies to the method 300, unless otherwise noted. The computer 22, 122 can receive an updated route either before or during flight at 302. The updated route can be received from any suitable source including ATC. Further still, the computer 22, 122 can request a subscription to a procedure such that any updates to that procedure are sent automatically from the remote server 30. In this manner, once the update module 42, 142 requests the subscription then data may be pushed appropriately from the ground station.

At 304, the update module 42, 142 can request a data update related to the updated route. In this manner, the receiving of the updated route can automatically trigger the updating system to request a data update. The computer 22, 122 can then automatically receive, via the wireless communication link 24, 124, flight procedure data in a data update at 306. The flight procedure data in the data update can be synched into the database component 40, 140 or supplemental database component 144. The flight procedure data in the data update can also be loaded straight into a datalink flight plan after pilot confirmation. The data link flight plan or modified/secondary flight plan is the non-active/primary flight plan that the pilot can review before accepting it.

It will be understood that the flight procedure data in the data update is related to the updated route. The term "related" as used herein means that the flight procedure data is in the vicinity of the updated route. The vicinity could be defined in the form of a tunnel specifying a band around position, including but not limited to latitude and longitude, altitude, or time. The vicinity could also include a predetermined region around the destination airport or a predetermined region around a set of alternate airports.

The information received in the data update can then be utilized in generating a route to be flown along the updated route at 308. More specifically, the FMS or aircrew can utilize the flight procedure data that was received in the data update in how the aircraft is flown along the updated route. The FMS can also provide the information received in the data update to other systems in the aircraft 10 such as the autopilot system or an onboard electronic flight bag. Thus, in the case where ATC uplinks route clearances or waypoints to the aircraft 10 electronically, the computer 22, 122 forming at least a portion of the FMS can then load the clearance or waypoint into the FMS where it can be inserted into the flight plan that will be used to guide the aircraft 10 during flight.

It will be understood that the method 300 is flexible and the method 300 is illustrated merely for illustrative purposes. For example, the sequence of steps depicted is for illustrative purposes only, and is not meant to limit the method 300 in any way, as it is understood that the steps can proceed in a different logical order or additional or intervening steps can be included without detracting from embodiments of the invention. By way of non-limiting example, it is contemplated that the FMS can determine if the updated route contains procedures missing from the database and the FMS can provide an alert within the aircraft 10 that the updated route contains procedures missing from the database. This can include that an alert can be provided to aircrew within the cockpit of the aircraft 10. Regardless of the triggering event it will be understood that the flight procedure data received in the data update is outside of typical database upkeep of the database component 40, 140 or supplemental database component 144.

Technical effects of the above-described embodiments include that information can be provided to an otherwise static database including but not limited to the navigation database of an aircraft, which has a current rigid predetermined update cycle (e.g., 28-days) where it is currently not possible to make any updates to the database outside of the cycle. In this manner, procedure updates can be uplinked to the aircraft's FMS dynamically and can be automatically updated based on route clearances uplinked by ATC, on a daily or hourly basis to reflect procedure changes, or based on changed atmospheric conditions including winds or severe weather. In this manner, flight crew can select the newly uploaded procedures into the flight plan allowing the aircraft to fly the procedure. Further still, the above-described embodiments can enable weather-optimized procedures. Further, the above-described embodiments can update the database by using a format that is already native to the database. The above-described embodiments result in savings on maintenance activity as the databases can be dynamically updated instead of being rigidly updated.

To the extent not already described, the different features and structures of the various embodiments can be used in combination with each other as desired. That one feature is not illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of providing a data update to an aircraft, the method comprising:
   receiving an up-link route clearance;
   determining the up-link route clearance includes a flight procedure that is not available in a static navigation database of the aircraft;
   in response to the determining, triggering a request, by an update module of the aircraft, for a data update for a route to be flown by the aircraft, wherein the route is a predefined route that is set before flight of the aircraft;
   receiving by a component of the aircraft, via a communication link, the data update, including flight procedure data, from a ground station in response to the request, wherein flight procedure data includes at least one of airport information, runway information, special activity spaces, or terminal procedures; and
   updating the route to be flown based at least in part on the flight procedure data.

2. The method of claim 1 wherein the component is a flight management system of the aircraft, and the static navigation database is included in the flight management system.

3. The method of claim 1 wherein the receiving the flight procedure data comprises at least one of: inserting the flight procedure data into a flight plan of the aircraft or synching the flight procedure data directly into a database.

4. The method of claim 1, further comprising formatting flight procedure data in the data update to be compatible with at least one of: a navigation database of the aircraft, or a supplemental navigation database of the aircraft.

5. A method of providing a data update to an aircraft having a predetermined route to be flown, the method comprising:
   receiving, by a flight management system of the aircraft, an updated route different from the predetermined route to be flown;
   determining the updated route includes a flight procedure missing from flight procedure data on the aircraft;
   in response to the determining, requesting, via an update module of the aircraft, a data update related to the updated route;

in response to the request, receiving by the flight management system, via a communication link, the data update, including flight procedure data including at least one of airport information, runway information, special activity spaces, or terminal procedures, from a ground station; and generating a route to be flown along the updated route based at least in part on the flight procedure data.

6. The method of claim 5, further comprising providing an alert within the aircraft that the updated route contains missing flight procedures, in response to determining the updated route includes a flight missing from flight procedure data on the aircraft.

7. The method of claim 5, further comprising providing flight procedure data included in the data update to at least one of: an electronic flight bag, or an autopilot system.

8. The method of claim 5, further comprising checking, via the flight management system, integrity of the flight procedure data in the data update.

9. The method of claim 5, further comprising checking, via the flight management system, authenticity of the flight procedure data in the data update.

10. The method of claim 5, further comprising formatting, via the flight management system, flight procedure data in the data update to be compatible with at least one of: a navigation database of the aircraft, or a supplemental navigation database of the aircraft.

11. The method of claim 5, wherein receiving the data update includes receiving the data update into an active flight plan of the flight management system.

* * * * *